Aug. 18, 1964     D. B. GARDNER ETAL     3,145,339
METER WITH ADJUSTABLE POINTER REFERENCE MARKERS
Filed July 12, 1960
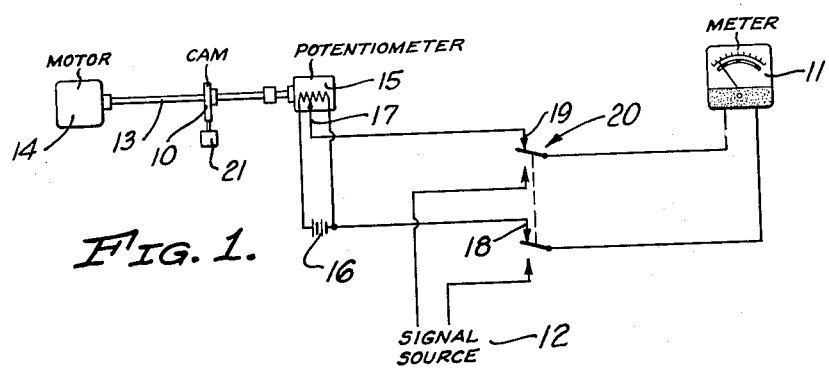
FIG. 1.
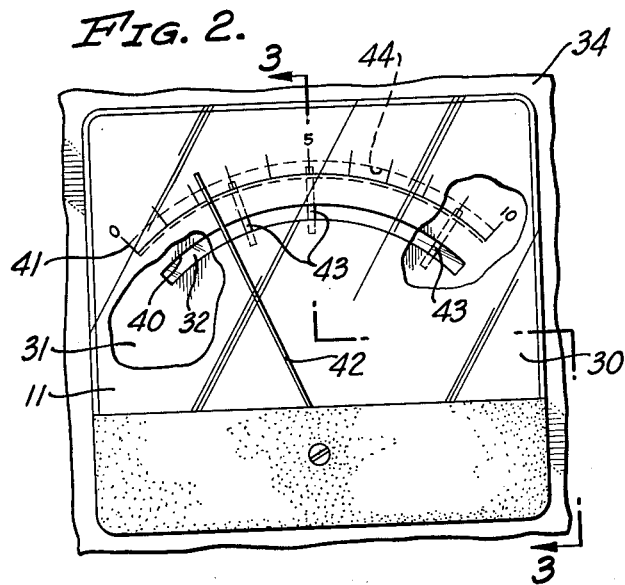
FIG. 2.
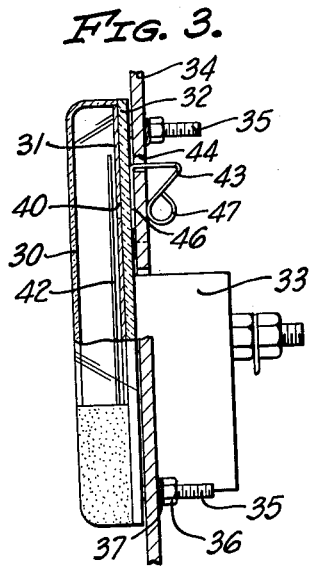
FIG. 3.
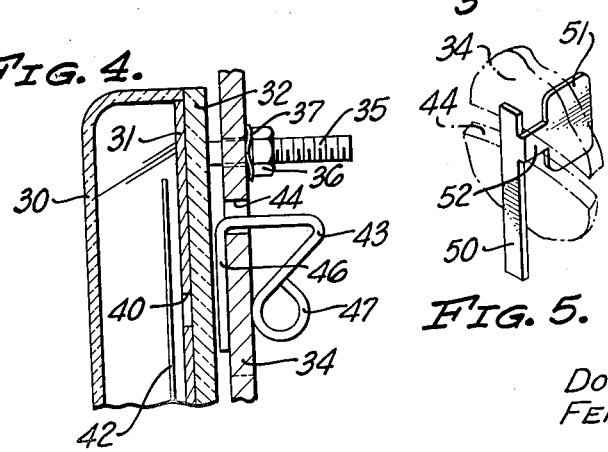
FIG. 4.     FIG. 5.     FIG. 6.
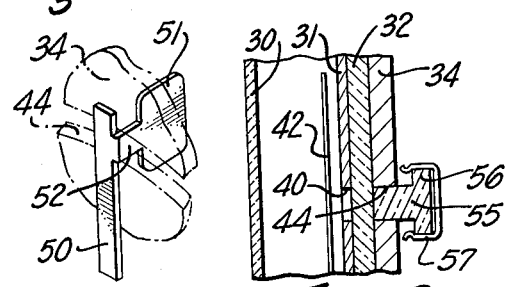
INVENTORS
DOUGLAS B. GARDNER,
FERNAND B. KUFFER.
BY THEIR ATTORNEYS
HARRIS, KIECH, RUSSELL & KERN United States Patent Office 3,145,339
Patented Aug. 18, 1964

3,145,339
METER WITH ADJUSTABLE POINTER
REFERENCE MARKERS
Douglas B. Gardner, La Puente, and Fernand B. Kuffer, Anaheim, Calif., assignors to Beckman Instruments, Inc., a corporation of California
Filed July 12, 1960, Ser. No. 42,421
3 Claims. (Cl. 324—157)

This invention relates to indicating apparatus for providing presentations, at control panels or similar location, of the condition of equipment at remote or relatively inaccessible points. The invention will be described herein as applied to the timing cams of a gas chromatograph such as that shown in the United States patent to Spracklen for Trend Recorder, No. 2,899,258, but of course is not limited to such application.

It is an object of the invention to provide an indicating apparatus for use with other equipment to provide an indication at the control console of the equipment of the condition of some remote portion of the equipment without requiring additional meters, mechanical linkage, or the like at the control console. A further object is to provide such apparatus which may be used with the conventional electrical meters already incorporated in the equipment. Another object is to provide such apparatus having one or more markers incorporated in the meter with the position of the markers being adjustable without requiring disassembly or access to the meter itself. A specific object is to provide indicating apparatus which can be used in indicating the position of remotely disposed potentiometers driven by motors, timing cams and the like.

It is an object of the invention to provide an indicating apparatus including an electrical meter having a face with a scale thereon and a pointer for movement along the scale and adapted for mounting at a panel or other support, with the face having a transparent section adjacent the scale for traverse by the pointer and for viewing the panel through the meter, marker means positioned at the back side of the meter and visible from the front side through the transparent section, and circuit means for connecting the meter movement to a voltage source which varies as a function of the variable being indicated. A further object is to provide such apparatus wherein the meter face and the mounting panel have displaced openings with the marker mounted in the opening of the panel and extending over the panel for viewing through the opening in the meter. Another object is to provide such apparatus including one or more markers which are movable along the opening in the panel for adjusting the marker positions without disturbing the meter itself.

It is an object of the invention to provide indicating apparatus including markers which are clamped in place against the panel by the meter when mounted against the panel. A further object is to provide resilient means for mounting the meter permitting the meter to be slightly displaced from the panel for adjustment of the marker positions without disturbing the installation.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 is an electrical diagram of the apparatus of the invention;
FIG. 2 is a front view of a meter mounted on a panel;
FIG. 3 is a sectional view taken along the line 3—3 of FIG. 2;
FIG. 4 is an enlarged view of a portion of FIG. 3;
FIG. 5 is an isometric view of an alternative form of marker; and
FIG. 6 is a sectional view similar to FIG. 4 showing another alternative form of the invention.

The indicating apparatus of the invention is used in FIG. 1 to indicate the position of a timing cam 10 of a gas chromatograph or similar equipment. The chromatograph includes a meter 11 mounted on the control panel which meter ordinarily has a signal source 12 coupled thereto as an input. The cam 10 is mounted on a shaft 13 driven by a drive unit 14 such as an electric motor and gear reduction unit. A 360° rotation potentiometer 15 is also driven from the shaft 13. A voltage source 16 is connected across the potentiometer 15 and one side of the source 16 and the arm 17 of the potentiometer are connected to fixed contacts 18, 19 respectively of a switch 20. The signal source 12 is connected to the other fixed contacts of the switch and the moving contacts of the switch are connected to the movement of the meter 11. With the switch 20 in the normal or down position, the signal source 12 is connected to the meter 11 for normal operation of the instrument. With the switch 20 in the up position, the variable voltage from the potentiometer is connected to the meter so that the movement of the pointer of the meter is synchronized with rotation of the shaft 13 and hence position of the cam 10 relative to the switch 21 actuated by the cam. The switch 20 could be a multiposition switch providing for successive connection of a plurality of different sources to the meter, such as in the setting and adjusting of an instrument prior to operation and subsequent operation of the instrument.

The meter 11 is a standard electrical meter modified as shown in FIGS. 2, 3 and 4. The meter includes a transparent front 30, a face 31 which ordinarily is opaque, and a transparent back 32, with the meter movement mounted in the cylindrical portion 33. The meter is mounted to a support, such as a panel 34 with the movement housing 33 and mounting studs 35 projecting through corresponding openings in the panel. The meter is fixed to the panel by nuts 36 threaded on the studs 35, preferably with flexible washers 37 positioned between the nuts and the panel.

A transparent section, preferably an opening 40, is provided in the face 31. The opening 40 is normally positioned adjacent the scale 41 of the meter and between the scale and the pivot point of the pointer 42 so as to be traversed by the pointer. This opening or transparent section permits viewing of the panel 34 or other backing surface from the front side of the meter.

Markers are provided at the back side of the meter for viewing through the opening 40. In the embodiment shown herein, clips 43 are mounted in an opening 44 in the panel 34, the opening 44 being displaced from the opening 40. The clip 43 is preferably formed of a strip of resilient material such as spring brass with a flat arm 46 for positioning against the meter side of the panel 34 and a loop 47 formed in the other arm for manually grasping the clip. The arm 46 is dimensioned so as to extend past the opening 40, best seen in FIG. 4, permitting viewing of the clip from the face of the meter. When the meter is mounted on the panel, the marker clips are clamped against the panel by the meter, as seen in FIG. 3, thus maintaining the clips fixed in place. The position of a marker clip may be changed by loosening the meter mounting nuts, permitting motion of a clip along the opening 44.

In the preferred installation shown herein, the resilient washers 37 are only partially compressed when the meter is installed on the panel. Then the washers may be further compressed by pulling the meter away from the panel, as shown in FIG. 4, providing clearance for the marker clips 33 and permitting manual adjustment of the clip position. When the clip is in the desired location, the meter is released and the flexible washers again clamp the clips in place between the meter and the panel.

In the embodiment shown herein, three marker clips are used to indicate different points in the operating cycle of the instrument. Each clip may be of a different color to indicate a different function. The relative positions of the opening 40, the meter scale 41 and the opening 44 are not critical. The opening 40 can be above the scale and the opening 44 can be below the scale or the opening 40. Of course, the invention is equally applicable to indicators having straight scales.

When the instrument of FIG. 1 is operated with the switch 20 in the upper position, movement of the pointer 42 along the scale 41 provides a continuous indication of the rotation of the shaft 13 and hence of the timing cam 10. The markers 43 identify cardinal points in the timing cycle. As indicated previously, these markers may be adjusted at any time without the necessity of opening the meter case or otherwise disturbing the instrument. It should be noted that if a continuous indication of cam position or shaft motion is desired during the operation of an instrument, the switch 20 can be omitted and the meter directly connected to the potentiometer.

Another marker which may be directly substituted for the clip 43 is shown in FIG. 5. The marker includes an indicating section 50 and an adjusting section 51 joined by a neck portion 52. The marker may be made of plastic or sheet metal or the like, with the indicating section 50 formed at a right angle to the adjusting section 51. The neck portion 52 is preferably made with a width substantially the same as the width of the opening 44 so that the marker can be frictionally clamped in place when rotated to the position shown in FIG. 5. The location of the marker can be changed by rotating the marker about 45° and then sliding it along the opening to the new location, after which it is rotated in the opposite direction to the upright position. The marker may be removed by rotating it about 90° and then passing it through the opening 44.

Another alternative form of the invention is shown in FIG. 6. This structure permits clamping of the meter directly against the panel or other mount and provides for adjustment of the marker position without disturbing the meter mounting. The opening 44 is provided in the panel 34 in a location for viewing from the front of the meter, ordinarily in alignment with the opening 40 in the face 31. A strip 55 of transparent material is fixed in the opening 44, with a flange 56 projecting from the back side of the panel. The markers are carried on the flange, a preferred form of marker being shown in FIG. 6. A C-shaped clip 57 formed of a resilient material is positioned over the flange. The clip is visible from the front side of the meter and one or more of such clips may be placed on the flange, moved along the flange to any desired position, and removed at will. The clips 57 are normally opaque and may be made of various colors to indicate various functions. A light source may be positioned behind the panel to more sharply define the position of the clips if desired.

Although an exemplary embodiment of the invention has been disclosed and discussed, it will be understood that other applications of the invention are possible and that the embodiments disclosed may be subjected to various changes, modifications and substitutions without necessarily departing from the spirit of the invention.

We claim as our invention:
1. In an indicating apparatus, the combination of: a meter mounting panel having an opening therein; an electrical meter having a face with a scale thereon and a pointer for movement along said scale, said face having an elongated opening therein substantially coextensive with said scale and traversed by said pointer; compressible means for mounting said meter on said panel with said scale, said pointer and the opening in said face visible from the front of said meter; marker means mounted in the opening in said panel and transversely movable along the elongated axis of the opening in said face, at least a portion of said marker means being visible through the opening in said face from the front of said meter; said meter clamping said marker means against said panel when said compressible means is partially compressed, said marker means being movable in the opening in said panel when said compressible means is further compressed by movement of said meter away from said panel.

2. In an indicating apparatus, the combination comprising: a meter mounting panel having an opening therein; an electrical meter having a face with a scale thereon and a pointer for movement along said scale, said face having an opening adjacent said scale and traversed by said pointer; means for mounting said meter on said panel with said scale, said pointer and a portion of said panel visible from the front of said meter; said means including studs on said meter projecting through holes in said panel; mating fasteners on said studs and compressible washers positioned between said panel and said fasteners; a marker mounted in the opening in said panel, said marker extending over said panel and traversing the opening in said face, said meter clamping said marker against said panel when said washers are partially compressed, said markers being movable in the opening in said panel when said washers are further compressed by movement of said meter away from said panel; and circuit means for connecting said meter to a source of voltage that varies as a function of the variable to be indicated by said meter.

3. In an indicating apparatus, the combination of: a meter having a face with a scale thereon and a pointer for movement along said scale, said face having an elongated opening substantially coextensive with said scale and traversed by said pointer; a meter mounting panel having an opening therein; a plurality of marker means secured in the opening in said panel and transversely movable along the elongated axis of the opening in said face; means for mounting said meter on said panel; said marker means being visible through the opening in said face from the front of said meter and being traversed by said pointer; a drive unit; a cam driven by said drive unit; a potentiometer driven by said drive unit in synchronism with said cam, said potentiometer having supply and signal terminals; a second pair of signal terminals; and a switching circuit for selectively connecting the potentiometer signal terminals and said second pair of signal terminals to the meter movement whereby said marker means may be positioned in the opening in said mounting panel to indicate the position of said cam when said potentiometer signal terminals are coupled to the movement.

References Cited in the file of this patent
UNITED STATES PATENTS

| | | |
|---|---|---|
| 687,948 | Wood | Dec. 3, 1901 |
| 1,741,702 | Kollsman | Dec. 31, 1929 |
| 2,329,715 | Grier | Sept. 21, 1943 |
| 2,420,574 | Tegge | May 13, 1947 |
| 2,439,857 | Millikan | Apr. 20, 1948 |
| 2,822,724 | Uffner | Feb. 11, 1958 |
| 2,836,793 | Kelly | May 27, 1958 |